(12) United States Patent
Urasaki (10) Patent No.: US 10,010,824 B2
(45) Date of Patent: Jul. 3, 2018

(54) DUST COLLECTION DEVICE

(71) Applicant: U.S. URASAKI Co., Ltd., Kakamigahara-shi, Gifu (JP)

(72) Inventor: Morihiro Urasaki, Kakamigahara (JP)

(73) Assignee: U.S. URASAKI CO., LTD., Kakamigahara-Shi, Gifu (JP)

( * ) Notice: Subject to any disclaimer, the term of this patent is extended or adjusted under 35 U.S.C. 154(b) by 0 days.

(21) Appl. No.: 15/322,665

(22) PCT Filed: Jul. 3, 2015

(86) PCT No.: PCT/JP2015/069284
§ 371 (c)(1),
(2) Date: Dec. 28, 2016

(87) PCT Pub. No.: WO2016/002934
PCT Pub. Date: Jan. 7, 2016

(65) Prior Publication Data
US 2017/0136397 A1    May 18, 2017

(30) Foreign Application Priority Data

Jul. 3, 2014  (JP) .................................. 2014-137858
Aug. 26, 2014  (JP) .................................. 2014-171588

(51) Int. Cl.
*B01D 46/00* (2006.01)
*B01D 46/52* (2006.01)
*B08B 5/02* (2006.01)

(52) U.S. Cl.
CPC ....... *B01D 46/0069* (2013.01); *B01D 46/002* (2013.01); *B01D 46/0068* (2013.01); *B01D 46/521* (2013.01); *B08B 5/02* (2013.01)

(58) Field of Classification Search
CPC .. B01D 46/00; B01D 46/0069; B01D 46/002; B01D 46/0068; B01D 46/521; B08B 5/02
(Continued)

(56) References Cited

U.S. PATENT DOCUMENTS 3,394,532 A     7/1968  Hans
3,913,884 A  *  10/1975  Rolfe ................... F16K 31/385
                                                            251/30.02
(Continued)

FOREIGN PATENT DOCUMENTS

JP    U1985189314     12/1985
JP    62-194488 U     12/1987
(Continued)

OTHER PUBLICATIONS

Notice for Reasons for Rejection (English Translation); Japanese Patent Office; Japanese Patent Application No. 2014-137858; dated Feb. 21, 2017; 3 pages.
(Continued)

*Primary Examiner* — T. Bennett McKenzie
(74) *Attorney, Agent, or Firm* — Schwabe Williams & Wyatt (57) ABSTRACT

A dust collection device (1) for removing fine particles from an atmosphere is provided with a filter (3), a blower (11), a dust removal device (7), and a pressure introduction device (9). The filter (3) removes fine particles from an atmosphere drawn into a filter chamber (5A). The blower (11) draws the atmosphere into the filter chamber (5A) and generates an air flow through the filter (3). The dust removal device (7) removes fine particles adhering to the filter (3). The pressure introduction device operates during operation of the dust removal device (7) and introduces an atmospheric pressure higher than the atmospheric pressure inside an air passage to the air passage downstream from the filter (3).

1 Claim, 10 Drawing Sheets

(58) Field of Classification Search
USPC .................................................. 55/282–305
See application file for complete search history.

(56) References Cited

U.S. PATENT DOCUMENTS

| | | | |
|---|---|---|---|
| 4,600,415 A * | 7/1986 | Barton ............... | B01D 46/0068 55/294 |
| 6,073,905 A | 6/2000 | Wilson | |
| 2006/0075726 A1 | 4/2006 | Yoshimoto | |

FOREIGN PATENT DOCUMENTS

| JP | 63-126588 U | 5/1988 |
|---|---|---|
| JP | U1989023540 | 7/1989 |
| JP | 2006110428 A | 4/2006 |
| JP | 2006272264 A | 10/2006 |
| JP | 2013215639 A | 10/2013 |

OTHER PUBLICATIONS

International Search Report for PCT/JP2015/069284 dated Oct. 6, 2015; 1 page.
International Bureau; International Preliminary Report on Patentability for PCT/JP2015/069284 dated Jan. 3, 2017; 7 pages.
Notice of Reason(s) for Rejection dated Oct. 18, 2016 in Japanese Patent Application No. 2014-137858 with English translation; 6 pages.
Notice for Reasons for Rejection (with English Translation); Japanese Patent Office; Japanese Patent Application No. 2014-137858; dated Jul. 25, 2017; 12 pages.
Decision for Refusal (with English Translation); Japanese Patent Office; Japanese Patent Application No. 2014-137858; dated Dec. 12, 2017; 2 pages.
Extended European Search Report; European Patent Office; European Patent Application No. 15815224.9; dated Jan. 15, 2018; 9 pages.

\* cited by examiner

DUST COLLECTION DEVICE

CROSS-REFERENCE TO RELATED APPLICATIONS

This international application claims the benefit of Japanese Patent Application No. 2014-137858 filed Jul. 3, 2014 and Japanese Patent Application No. 2014-171588 filed Aug. 26, 2014 in the Japan Patent Office, and the entire disclosures of Japanese Patent Application No. 2014-137858 and Japanese Patent Application No. 2014-171588 are incorporated herein by reference.

TECHNICAL FIELD

The present invention relates to a dust collection device that removes dust in an atmosphere by a filter.

BACKGROUND ART

A dust collection device traps dust in the air by a filter when the air passes through the filter (hereinafter, referred to as "filtering"). Accordingly, the dust removed from the air is gradually accumulated in a state adhering to a surface of the filter.

In the dust collection device described in Patent Document 1, the dust adhering to the surface of the filter is removed (hereinafter, referred to as "dedusting") by reversing a direction of an air flow during filtering.

PRIOR ART DOCUMENTS

Patent Documents

Patent Document 1: Japanese Examined Utility Model Application Publication No. 1-23540

SUMMARY OF THE INVENTION

Problems to be Solved by the Invention

In one aspect of the present invention, it is desirable to provide a dust collection device that employs a dedusting method different from a dedusting method described in Patent Document 1.

Means for Solving the Problems

A dust collection device in one aspect of the present invention that removes dust in an atmosphere comprises a filter, a blower, a dust removal device, and a pressure introduction device. The filter removes the dust from the atmosphere drawn into a filter chamber. The blower draws the atmosphere into the filter chamber, and generates an air flow passing through the filter. The dust removal device removes the dust adhering to the filter. The pressure introduction device operates during operation of the dust removal device and introduces an atmospheric pressure higher than an atmospheric pressure in an air passage downstream of the filter to the air passage.

Accordingly, in one aspect of the present invention, when the dust removal device is operated to perform dedusting, a pressure difference between a downstream side and an upstream side of the filter is reduced. The dust adhering to and accumulated on a surface of the filter can be easily removed.

Most of the dust trapped in the filter adheres to and are accumulated on the filter surface on the upstream side. In a state in which the blower is running and the air is passing through the filter, the upstream side of the filter has a higher atmospheric pressure than the downstream side.

In a state in which the blower is running, the dust adhering to and accumulated on the surface of the filter are stuck on the surface of the filter by the pressure difference. For this reason, even if the dust collection device is operated in the state in which the blower is running, it is difficult to perform dedusting efficiently.

To solve this problem, there may be a way to "stop the blower during operation of the dust removal device so as to reduce the pressure difference", for example. However, in this way, the dust removal device cannot be activated until the blower stops and the pressure difference is reduced.

In the one aspect of the present invention, since a high atmospheric pressure is introduced to the air passage on the downstream side during operation of the dust removal device, the pressure difference can be reduced without stopping of the blower. Therefore, it becomes possible to easily remove the dust adhering to and accumulated on the surface of the filter.

The dust collection device in one aspect of the present invention, since a high atmospheric pressure is introduced to the air passage on the downstream side during operation of the dust removal device, the blower may be either stopped or operated during operation of the dust removal device.

EXPLANATION OF REFERENCE NUMERALS

1 . . . dust collection device, 3 . . . filter, 3A . . . core member, 3B . . . filter paper member, 3C . . . closure member, 5 . . . dust collection casing, 5A . . . filter chamber, 7 . . . dust removal device, 9 . . . pressure introduction device, 9A . . . communication passage, 9B . . . on-off valve, 9C . . . actuator, 9D . . . hinge, 11 . . . blower, 11A . . . centrifugal fan, 11B . . . scroll casing, 11D . . . inlet, 11E . . . outlet, 13 . . . partition wall, 13A . . . opening, 15A . . . exhaust side space, 15B . . . intake side space, 17 . . . exhaust unit, 17A . . . exhaust port, 19 . . . dust collection unit, 71 . . . accumulator unit, 73 . . . accelerator, 73A . . . injection port, 73B . . . narrowed portion, 73D . . . expansion portion, 73F . . . cylindrical portion, 73C . . . throat portion, 73G . . . small hole, 73E . . . valve portion, 73H . . . housing

MODE FOR CARRYING OUT THE INVENTION

"Mode for carrying out the invention" described below provides embodiments by way of example. In other words, subject matters, etc. in the appended claims are not intended to be limited to specific means or structures appearing in the following embodiments.

Arrows etc. indicating directions in each figure are provided for easy understanding of a mutual relationship of the figures. The present invention is not limited to the directions depicted in the figures. At least one member or portion is provided for those denoted at least by reference numerals, unless otherwise specified, for example, as "multiple" or "two or more" members or portions. Hereinafter, the embodiments of the present invention will be described in conjunction with the accompanying drawings.

[First Embodiment]

1. Overview of Dust Collection Device

Figure 1:
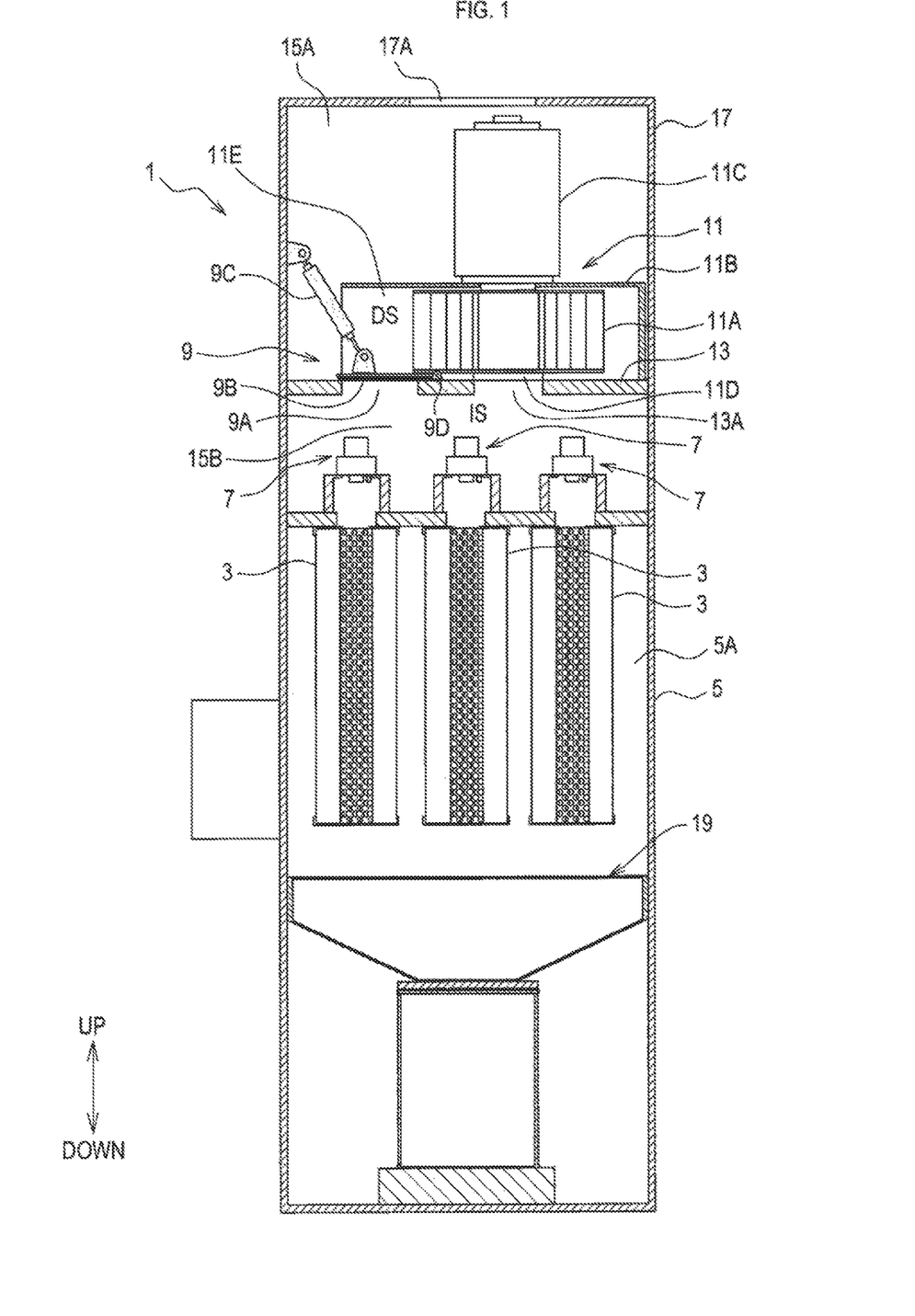
FIG. 1 is a cross sectional view showing a schematic structure of a dust collection device according to a first embodiment of the present invention.

As shown in FIG. 1, a dust collection device 1 comprises a filter 3, a dust collection casing 5, a dust removal device 7, a pressure introduction device 9, a blower 11, and so on. The dust collection device 1 according to this embodiment is a device for trapping fine particles (hereinafter, referred to as dust) of aggregated metal vapor generated during laser machining and welding operation.

The filter 3 filters dust in the air (atmosphere) that is drawn into the dust collection casing 5 so as to remove the dust in the air. The filter 3 has a cylindrical core member 3A made of a punched metal, a filter paper member 3B folded into a bellows (see FIG. 2), etc. The filter 3 is formed into a substantially cylindrical shape.

Figure 2:
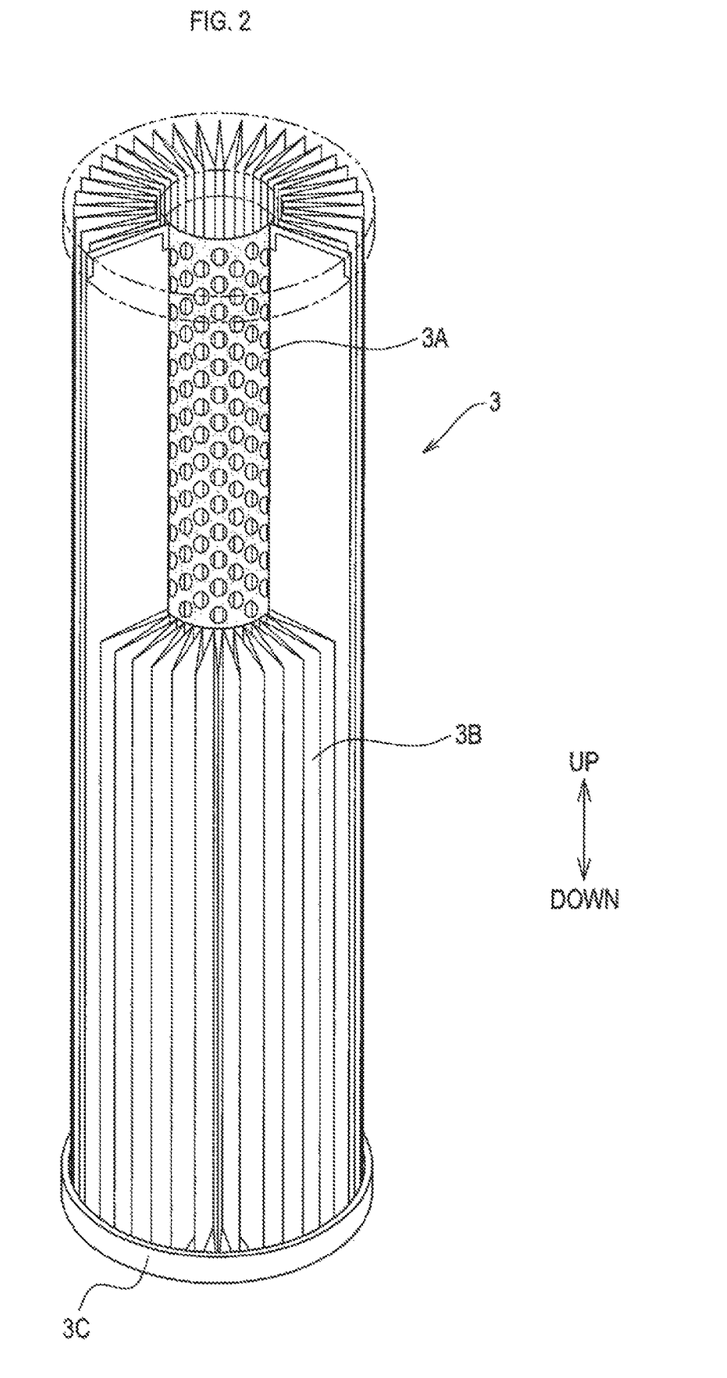
FIG. 2 is a diagram showing a structure of a filter for use in the dust collection device according to the first embodiment of the present invention.

The air containing dust flows from an outer peripheral surface of the filter 3 to the core member 3A. Then, when the air passes through the filter paper member 3B, the dust is trapped in the filter paper member 3B. Therefore, in the filter 3 according to the present embodiment, the trapped dust is accumulated on the outer peripheral surface of the filter 3.

Figure 3:
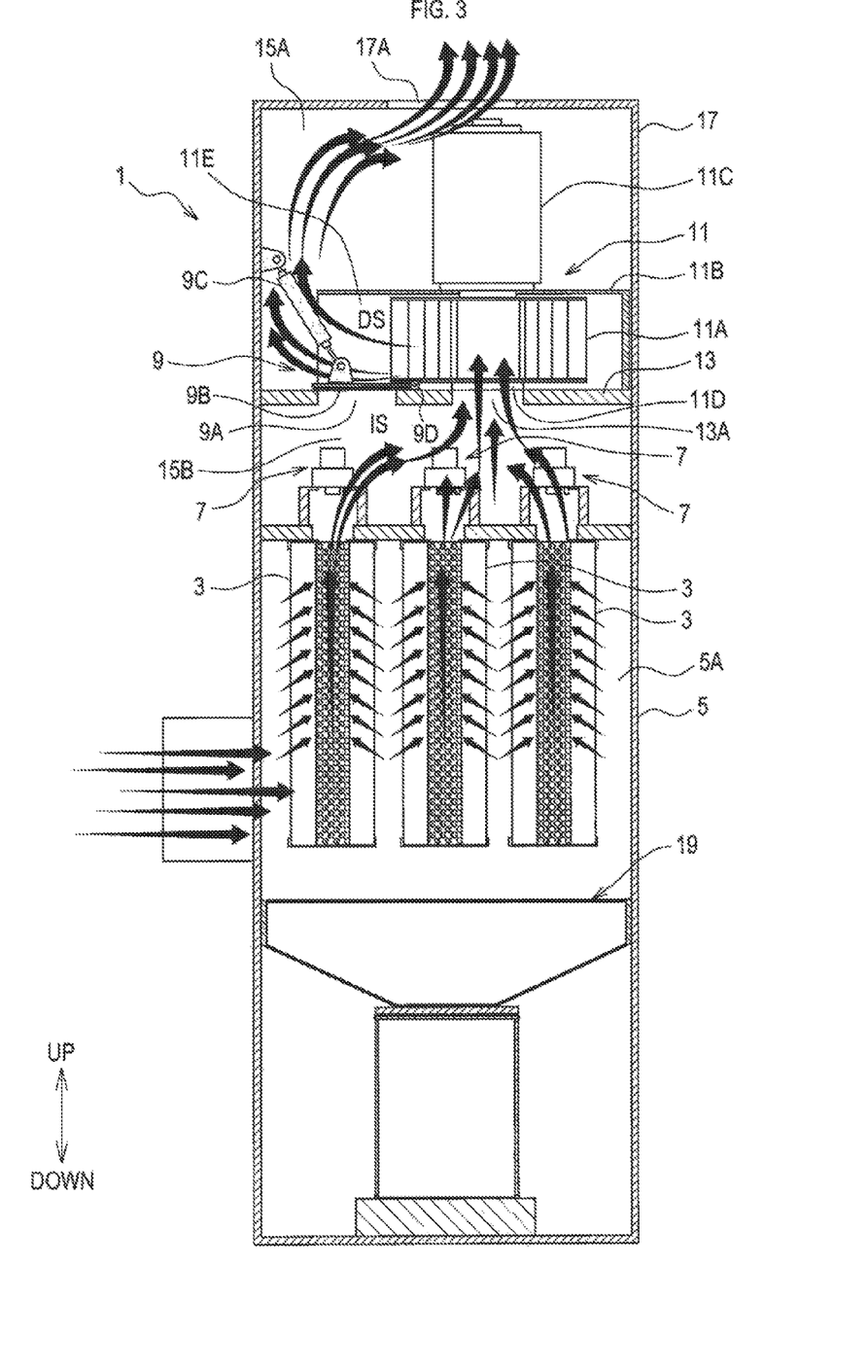
FIG. 3 is a cross sectional view showing a state during filtering of the dust collection device according to the first embodiment of the present invention.

As shown in FIG. 1, the dust collection casing 5 comprises a filter chamber 5A. The filter chamber 5A accommodates the filter 3. The blower 11, as shown in FIG. 3, draws the air containing dust into the filter chamber 5A from outside of the filter chamber 5A, and generates an air flow passing through the filter 3.

The air filtered by the filter 3 (filter paper member 3B), after flowing through the core member 3A and sucked into the blower 11, is discharged to outside of the dust collection device 1.

One end in an axial direction of the filter 3 (core member. 3A) (lower end in this embodiment) is closed by a closure member 3C. For this reason, the filtered air flows through the filter 3 (core member 3A) from the one end in the axial direction to the other end, that is, from the lower end to an upper end.

The blower 11, as shown in FIG. 1, comprises a centrifugal fan 11A, a scroll casing 11B, an electric motor 11C, and so on. The centrifugal fan 11A is a fan through which the air passes through in a radial direction of the fan (see JIS B0132, numbers 1003 and 1004).

The scroll casing 11B is a spiral casing that accommodates the centrifugal fan 11A. An inlet 11D is provided at a spiral center of the scroll casing 11B. The inlet 11D is opened toward a direction parallel to an axis of rotation of the centrifugal fan 11A.

An outlet 11E that is open toward a tangential direction is provided on an outer periphery of the scroll casing 11B. The blower 11 is assembled into a partition wall 13 in a state in which an opening 13A of the partition wall 13 coincides with the inlet 11D.

The partition wall 13 separates the filter chamber 5A and a space in which the blower 11 is accommodated (hereinafter, referred to as an exhaust side space 15A). In other words, a discharge side (DS) of the blower 11 and an intake side (IS) of the blower 11 are separated by the partition wall 13. Thus, an air passage downstream of the filter 3, that is, an intake side space 15B leading to the inlet 11D of the blower 11 from inside of the core member 3A, is separated from the exhaust side space 15A by the partition wall 13.

An exhaust port 17A in communication with the outside is provided in an exhaust unit 17 comprising the exhaust side space 15A. The exhaust port 17A is an opening for discharging the air after dedusting that has passed through the filter 3 out of the dust collection device 1.

The exhaust port 17A is always in communication with the discharge side (exhaust side space 15A) of the blower 11. In other words, the exhaust port 17A is in communication with the exhaust side space 15A, regardless of whether the dust removal device 7 is in operation or not in operation.

2. Dust Removal Device 2.1 Overview of Dust Removal Device

The dust removal device 7 removes the dust adhering to the surface of the filter 3 (filter paper member 3B). That is, the dust removal device 7 accelerates the air flow supplied from an accumulator unit 71 to be described later and injects the accelerated air flow toward the filter 3 to remove the dust adhering to the filter 3 from the filter 3.

The dust removed by the dust removal device 7 is collected in a dust collecting unit 19 provided in a lower part of the filter chamber 5A (see FIG. 1).

2.2 Configuration of Dust Removal Device

Figure 4:
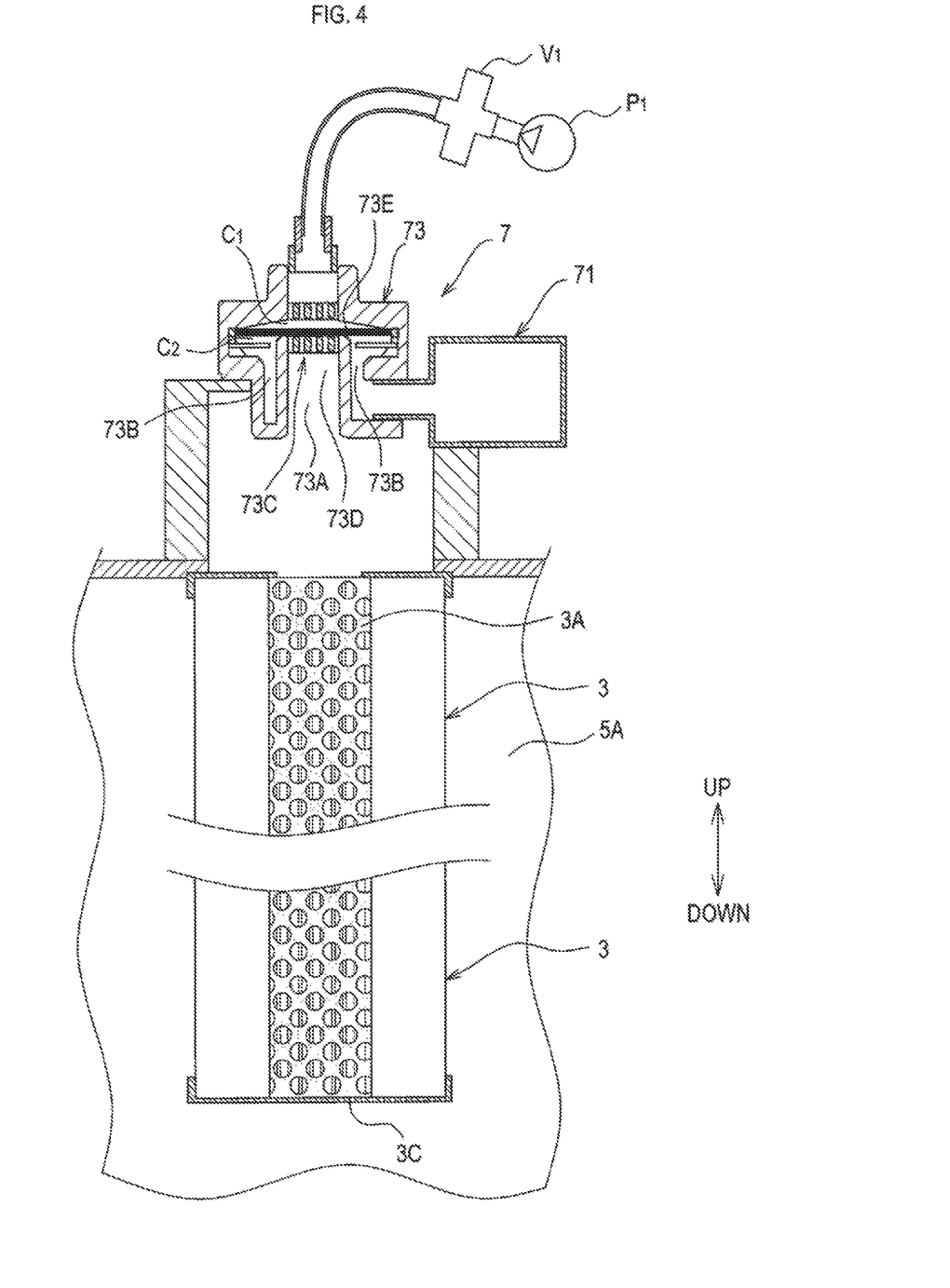
FIG. 4 is a cross sectional view showing a schematic structure of a dust removal device according to the first embodiment of the present invention.

The dust removal device 7, as shown in FIG. 4, comprises at least the accumulator unit 71 and the accelerator 73. The accumulator unit 71 is filled with a pressurized gas. In the present embodiment, a gas pressurized to approximately 0.5 MPa by a pump P1 is filled in the accumulator unit 71.

Figure 5A:
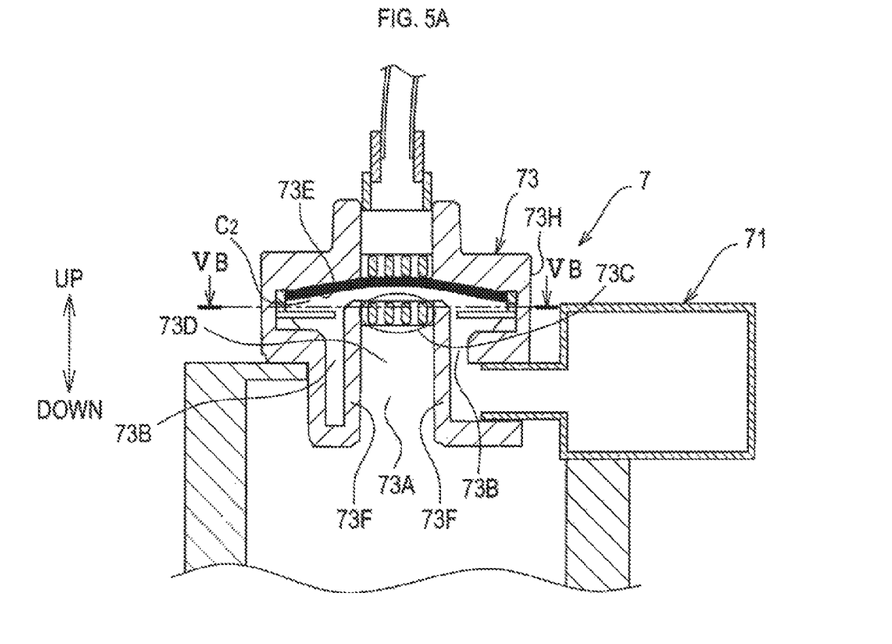
FIG. 5A is a sectional view showing a schematic structure of an accelerator for use in the dust collection device according to the embodiment of the present invention.

The accelerator 73 accelerates the gas filled in the accumulator unit 71 and blows the accelerated gas toward the filter 3. Specifically, the accelerator 73, as shown in FIG. 5A, comprises an injection port 73A, a narrowed portion 73B, an expansion portion 73D, a valve portion 73E, etc.

The accelerated gas is blown out through the injection port 73A towards the filter 3. The injection port 73A according to the present embodiment is an opening that is opened toward the other end in the axial direction (upper end in this embodiment) of the filter 3.

The narrowed portion 73B narrows down the air flow discharged from the accumulator unit 71 to accelerate the air flow. The narrowed portion 73B according to this embodiment is a passage for air that is formed on an outer periphery of a cylindrical portion 73F, and is always in communication with the accumulator unit 71. The narrowed portion 73B guides the air from the accumulator unit 71 to a throat portion 73C. The closer the throat portion 73C is, the smaller a cross sectional area of the passage is.

The cylindrical portion 73F is a cylindrical member, one end of which in an axial direction (lower end in FIG. 5A) is provided with the injection port 73A, and the other end of which in the axial direction (upper end in FIG. 5A) is provided with the throat portion 73C.

Figure 5B:
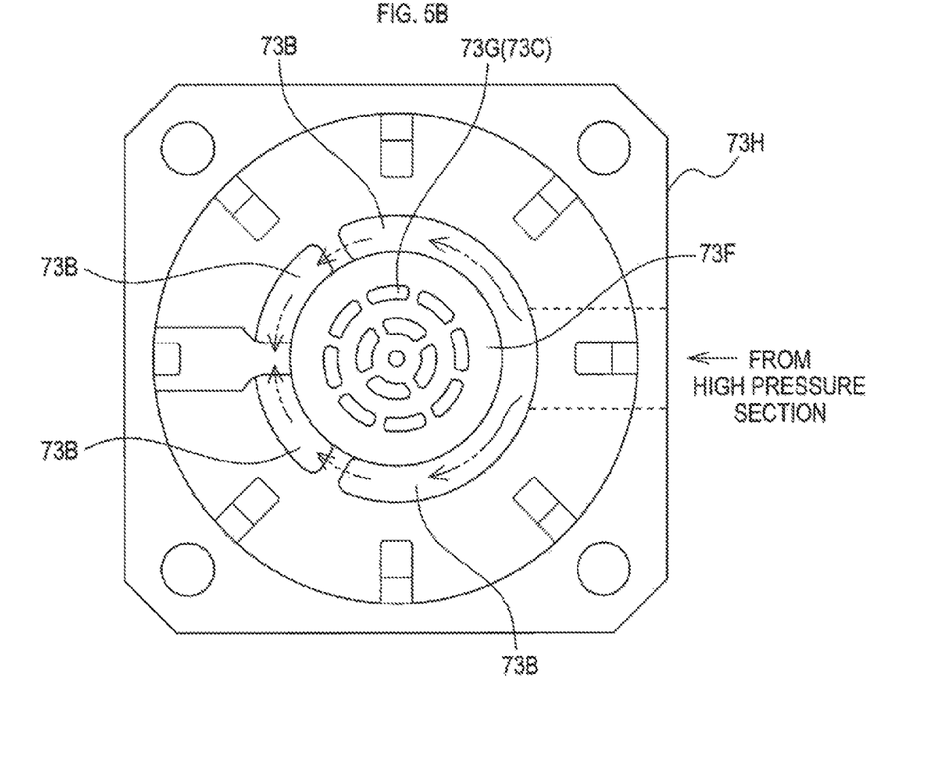
FIG. 5B is a VB-VB cross sectional view of FIG. 5A.

The throat portion 73C is a member in which the cross sectional area of the narrowed portion 73B is smallest. The throat portion 73C of the present embodiment is comprised of a plurality of small holes 73G (see FIG. 5B). The expansion portion 73D further accelerates the air flow ejected from the throat portion 73C by inflating the air flow.

The valve portion 73E opens and closes the throat portion 73C. The valve portion 73E is comprised of a disk-shaped diaphragm that is elastically deformed like a disc spring. The valve portion 73E has a larger radius than an inner diameter of the cylindrical portion 73F.

The valve portion 73E opens and closes the throat portion 73C in accordance with a difference between a pressure acting on one surface (upper surface in FIG. 5A) of the valve portion 73E and a pressure acting on the other surface (lower surface in FIG. 5A).

2.2 Opening and Closing Operation of Valve Portion

The upper surface of the valve portion 73E, as shown in FIG. 4, can communicate with the pump P1 and the discharge side via a three-way valve V1. The three-way valve V1 is a switching valve for selecting one of (a) permitting an upper surface side space C1 of the valve portion 73E to communicate with the pump P1 and the discharge side, (b) opening the upper surface side space C1 to the atmosphere, and (c) sealing the upper surface side space C1.

<When Filling Air into Accumulator Unit>

Figure 6:
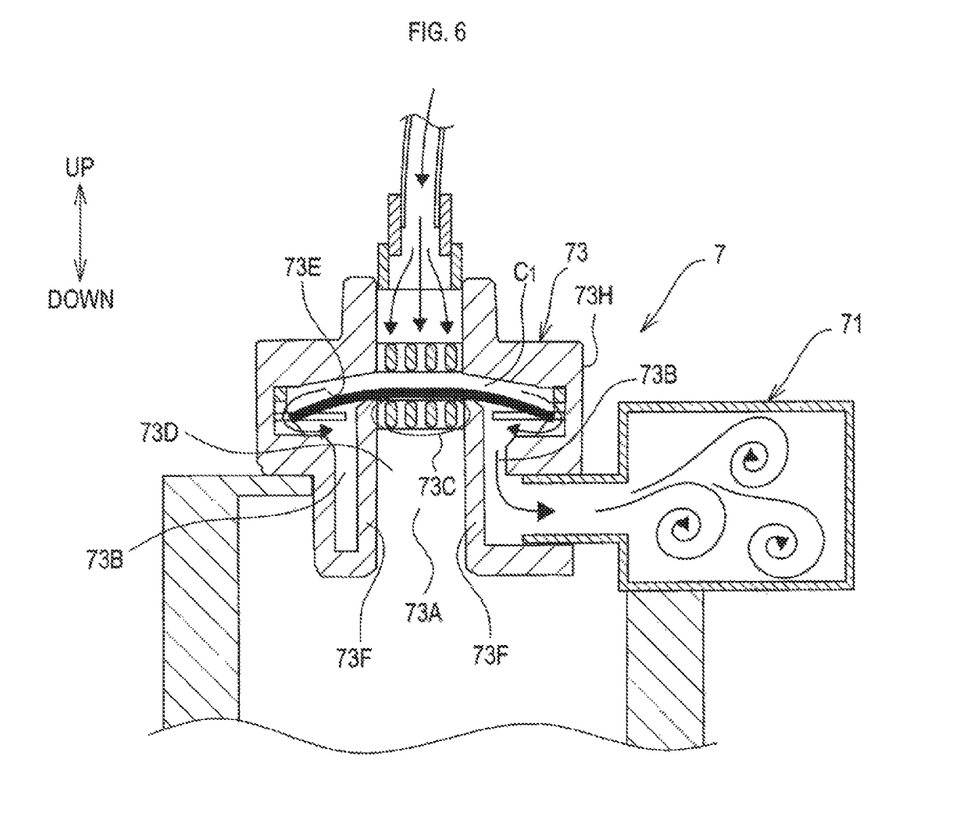
FIG. 6 is an explanatory view of operation of the accelerator for use in the dust collection device according to the first embodiment of the present invention.

When the three-way valve V1 is operated to permit the upper surface side space C1 to communicate with the pump P1 and the discharge side while the pressure in the accumulator unit 71 is lower than a discharge pressure of the pump P1, a force due to the pressure acting on the upper surface of the valve portion 73E becomes greater than a force due to the pressure acting on the lower surface of the valve portion 73E. Therefore, as shown in FIG. 6, the air supplied from the pump P1 flows through a gap between an outer peripheral edge of the valve portion 73E and a housing 73H to flow into the accumulator unit 71.

The force due to the pressure acting on the upper surface of the valve portion 73E is "the pressure×the upper surface area of the valve portion 73E". The force due to the pressure acting on the lower surface of the valve portion 73E is "the atmospheric pressure×the cross sectional area of the throat portion 73C+the pressure inside the accumulator unit 71×(the lower surface area of the valve portion 73E−the cross sectional area of the throat portion 73C)".

<Accumulation State>

Figure 7:
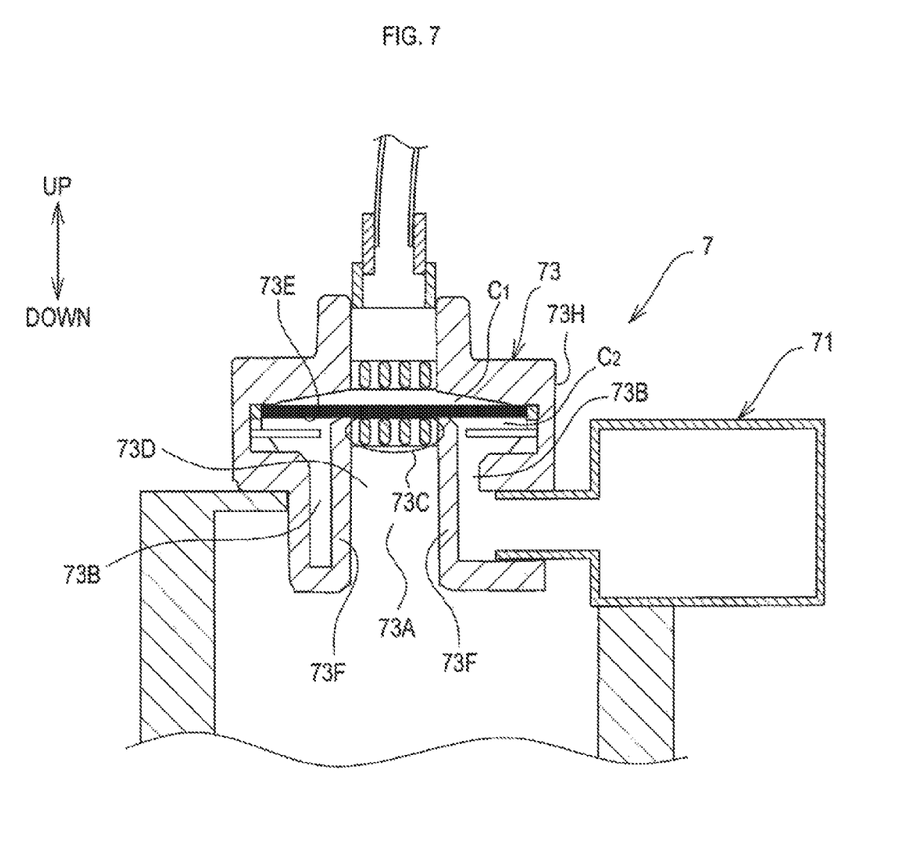
FIG. 7 is an explanatory view of operation of the accelerator for use in the dust collection device according to the first embodiment of the present invention.

When the pressure inside the accumulator unit 71 becomes the same as the discharge pressure of the pump P1, the three-way valve V1 is actuated to seal the upper surface side space C1 (see FIG. 7). Thus, the accumulator unit 71 and the narrowed portion 73B become filled with the pressurized air, and the filled state is maintained.

In the present embodiment, no pressure sensor is provided for detecting whether the pressure inside the accumulator unit 71 is the same as the discharge pressure of the pump P1. When a predetermined time period (e.g., 2 to 3 seconds) has elapsed since the three-way valve V1 is operated to permit the upper surface side space C1 to communicate with the pump P1 and the discharge side, it is considered that the pressure in the accumulator unit 71 has become the same as the discharge pressure of the pump P1, and the three-way valve V1 is operated.

<When Air is Blown Out from Injection Port>

Figure 8:
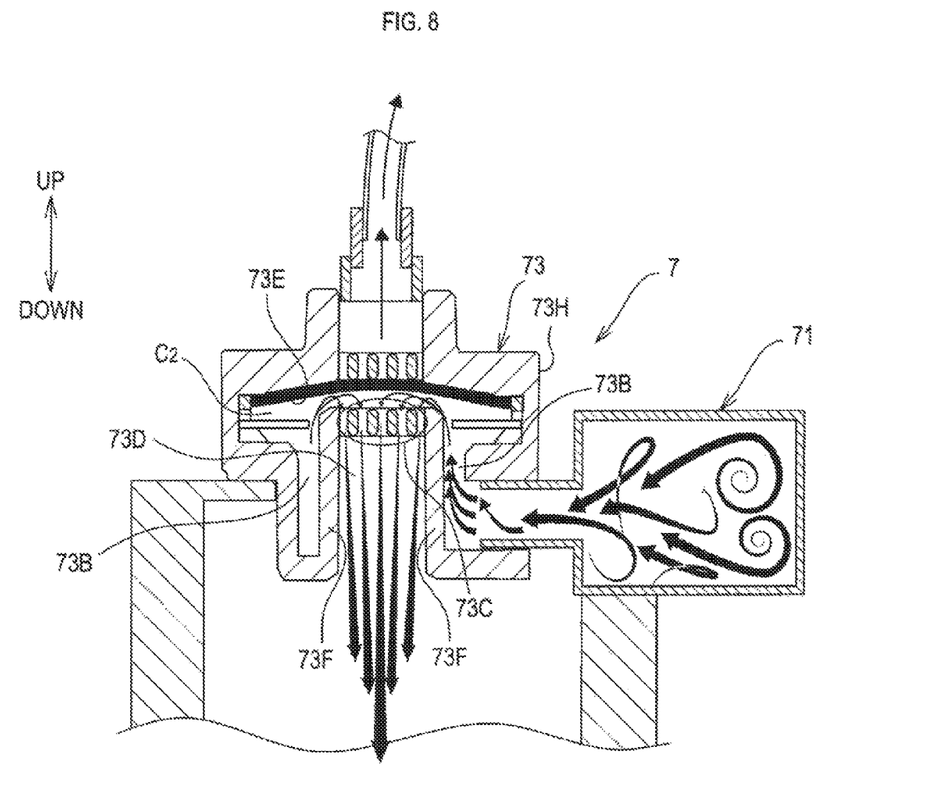
FIG. 8 is an explanatory view of operation of the accelerator for use in the dust collection device according to the first embodiment of the present invention.

The three-way valve V1 is operated so as to open the upper surface side space C1 to the atmosphere. Then, the force due to the pressure acting on the upper surface of the valve portion 73E falls below the force due to the pressure acting on the lower surface of the valve portion 73E. Therefore, as shown in FIG. 8, the valve portion 73E is separated from the throat portion 73C to open the throat portion 73C and seals the air passage to the pump P1.

The air flow ejected from the accumulator unit 71 flows from the throat portion 73C to the expansion portion 73D after flowing into the valve portion 73E along the outer periphery of the cylindrical portion 73F. The air flow that has flowed into the expansion portion 73D is blown from the injection port 73A toward the filter 3.

3. Pressure Introduction Device 3.1 Overview of Pressure Introduction Device

The pressure introduction device 9 is a device that introduces a higher atmospheric pressure to the intake side space 15B than an atmospheric pressure in the intake side space 15B, upon operation of the dust removal device 7. That is, the pressure introduction device 9 increases the pressure in the intake side space 15B, when the air is blown from the injection port 73A. More specifically, as shown in FIG. 9, the pressure introduction device 9 introduces a pressure on the discharge side of the blower 11 to the intake side space 15B when the blower 11 is running and when the dust collection device 7 is being operated.

3.2 Configuration of Pressure Introduction Device

Figure 9:
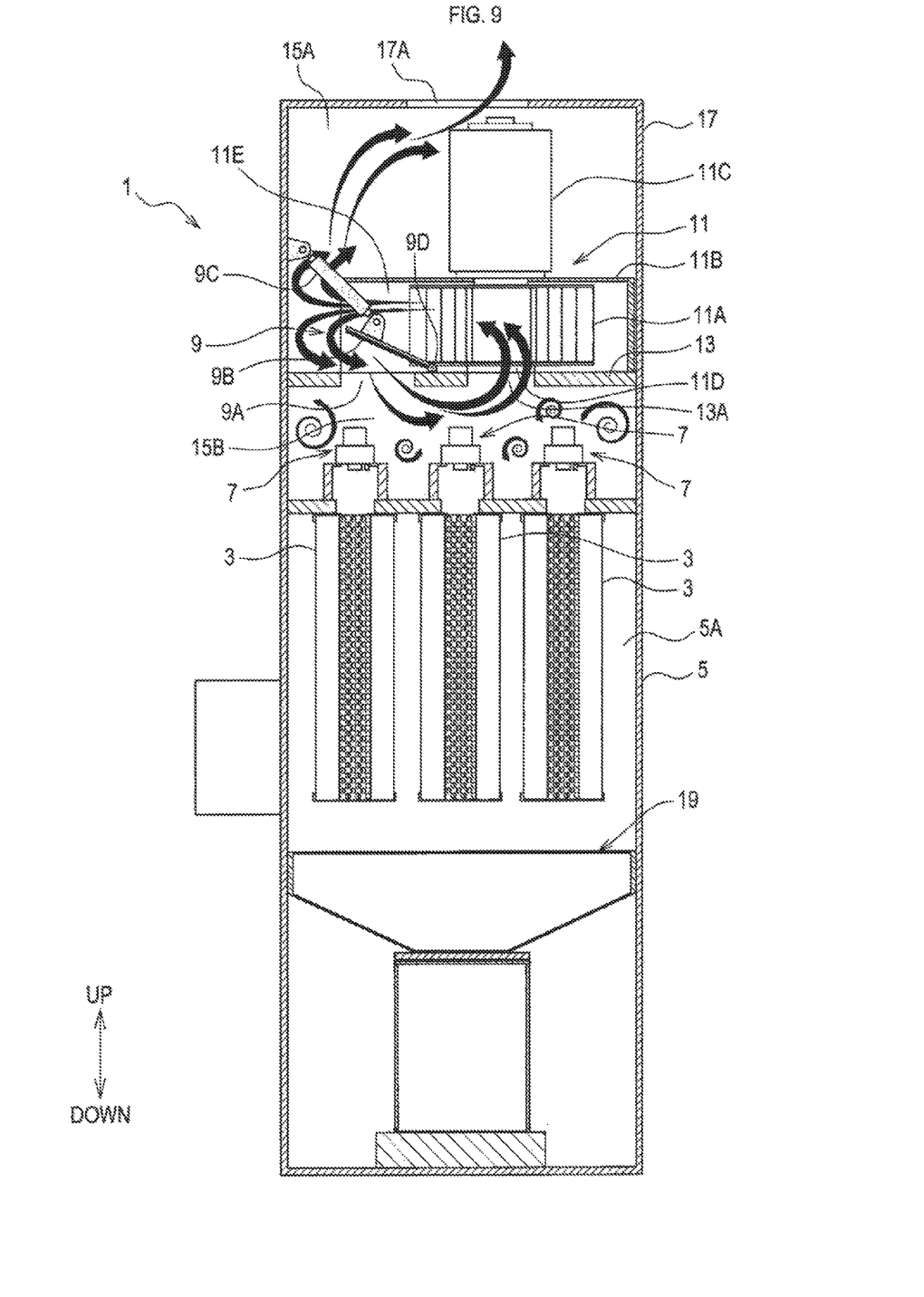
FIG. 9 is a cross sectional view showing a state during dedusting of the dust collection device according to the first embodiment of the present invention.

The pressure introduction device 9, as shown in FIG. 9, comprises an on-off valve 9B that opens and closes a communication passage 9A, an actuator 9C that operates the on-off valve 9B to be opened and closed, and so on. The communication passage 9A permits the discharge side (DS) of the blower 11 to communicate with the intake side (IS) of the blower 11.

The communication passage 9A according to the present embodiment is an opening provided in the partition wall 13, and permits the exhaust side space 15A to communicate with the intake side space 15B. The actuator 9C operates the on-off valve 9B to be opened and closed in conjunction with the operation of the dust removal device 7. In other words, the actuator 9C opens the communication passage 9A during dedusting of the filter 3, and closes the communication passage 9A during non-dedusting of the filter 3.

The on-off valve 9B is disposed on the discharge side of the blower 11 (exhaust side space 15A) with respect to the communication passage 9A to be displaced. That is, as shown in FIG. 1, the on-off valve 9B is a door-like member which is assembled to the partition wall 13 in a swingable manner.

The on-off valve 9B is assembled to the partition wall 13 via a hinge 9D provided upstream of the air flow blown from the blower 11. Therefore, as shown in FIG. 9, when the on-off valve 9B is in a position to open the communication passage 9A, the on-off valve 9B receives a dynamic pressure (wind pressure) in a direction to close the communication passage 9A from the blower 11.

Operations of the dust removal device 7, the pressure introduction device 9, and the blower 11 are controlled by a not shown control unit (controller). The control unit according to this embodiment is operated in conjunction with the dust removal device 7 and the pressure introduction device 9 per a predetermined time period from when the blower 11 is started to run, without stopping the blower 11.

4. Features of Dust Collection Device According to Embodiment

In the present embodiment, a higher atmospheric pressure than that in the intake side space 15B is introduced to the intake side space 15B upon operation of the dust removal device 7. Thus, the pressure difference between downstream and upstream sides of the filter 3 can be reduced. Therefore, the dust adhering to and accumulated on the surface of the filter 3 can be easy removed.

That is, most of the dust trapped on the filter 3 adheres to and accumulated on the upstream side of the filter surface. In a state in which the blower 11 is running and the air is passing through the filter 3, the upstream side of the filter 3 has a higher atmospheric pressure than the downstream side.

In a state in which the blower 11 is running, the dust adhering to and accumulated on the surface of the filter 3 is stuck on the surface of the filter 3 by the pressure difference. For this reason, there is a problem in that it is difficult to remove the dust efficiently even if the dust removal device 7 is operated while the blower 11 is running.

In the present embodiment, since a high atmospheric pressure is introduced to the intake side space 15B on the downstream side during operation of the dust removal device 7. Thus, without stopping the blower 11, reduction of the pressure difference can be achieved. Therefore, the dust adhering to and accumulated on the surface of the filter 3 can be easily removed.

The pressure introduction device 9 is configured to introduce the discharge pressure of the blower 11 to the intake side space 15B. Thus, the atmospheric pressure in the intake side space 15B can be increased in a very short time. Therefore, without stopping the blower 11 (dust collection device 1), the dust on the filter 3 can be removed in a short time.

The on-off valve 9B is disposed on the discharge side (exhaust side space 15A) of the communication passage 9A. Thus, reliable sealing of the communication passage 9A can be achieved by utilizing the discharge pressure of the blower 11. Therefore, an air blowing loss, such as a decrease in an air flow rate during filtering, can be reduced.

In other words, during filtering, the atmospheric pressure on the discharge side (exhaust side space 15A) is higher than the atmospheric pressure on the intake side (intake side space 15B). Because of this, if the on-off valve 9B is disposed on the intake side (intake side space 15B) of the communication passage 9A, the on-off valve 9B may slightly open by the pressure difference between the exhaust side space 15A and the intake side space 15B. If the on-off valve 9B slightly opens, an air volume drawn into the filter chamber 5A, that is, an air volume passing through the filter 3, may be decreased.

In the present embodiment, the on-off valve 9B is disposed on the discharge side (exhaust side space 15A) of the communication passage 9A. Thus, the pressure difference between the exhaust side space 15A and the intake side space 15B generates a force to close the communication passage 9A to act on the on-off valve 9B. Therefore, in the present embodiment, a decrease in the air flow rate during filtering can be suppressed.

The on-off valve 9B according to the present embodiment, as shown in FIG. 9, is configured to receive the dynamic pressure in the direction to close the communication passage 9A from the blower 11 when the on-off valve 9B is in the position to open the communication passage 9A. Accordingly, the on-off valve 9B can be reliably sealed using the dynamic pressure, the air blowing loss can be reliably reduced.

Further, in the accelerator 73 according to the present embodiment, the air flow flowing out of the accumulator unit 71 is narrowed by the narrowed portion 73B and increases the flow rate to reach the throat portion 73C. Since the air flow that has been ejected from the throat portion 73C to the expansion portion 73D expands in the expansion portion 73D, the air flow is ejected toward the filter 3 at a stretch in a very short time less than one second, and may be accelerated to a speed of sound or more, or to a subsonic speed.

Therefore, the air injected from the injection port 73A acts as a "lump" that has the same mass as that of air accumulated in the accumulator unit 71. That is, a state is generated in which a shock wave or an air flow with an energy close to the shock wave (hereinafter, referred to as "shock wave" including such an air flow) is emitted to the filter 3 from the injection port 73A.

Thus, since the filter 3 is in a state of being hit and repelled by the shock wave (lump of air), the dust adhering to the filter 3 drops from the filter 3 and removed by the impact. If the flow rate of the air injected from the injection port 73A is accelerated to the speed of sound or more, or to the subsonic speed, the dust can be removed more reliably.

[Second Embodiment]

The pressure introduction device 9 according to the first embodiment is configured to introduce the pressure on the discharge side of the blower 11 to the intake side space by permitting the discharge side (DS) of the blower 11 to communicate with the intake side (IS) of the blower 11.

Figure 10A:
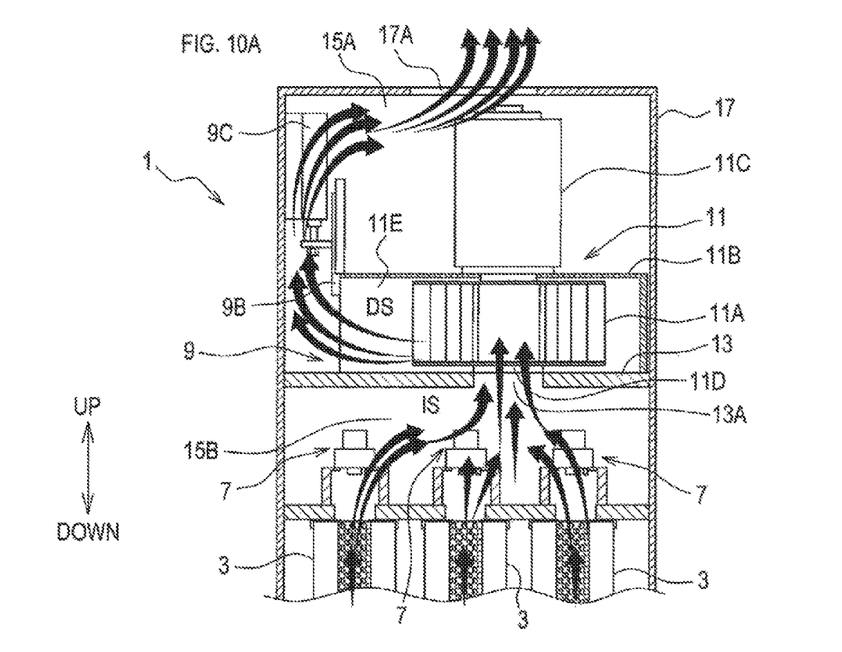
FIGS. 10A and 10B are sectional views each showing a schematic structure of a dust collection device according to a second embodiment of the present invention.
Figure 10B:
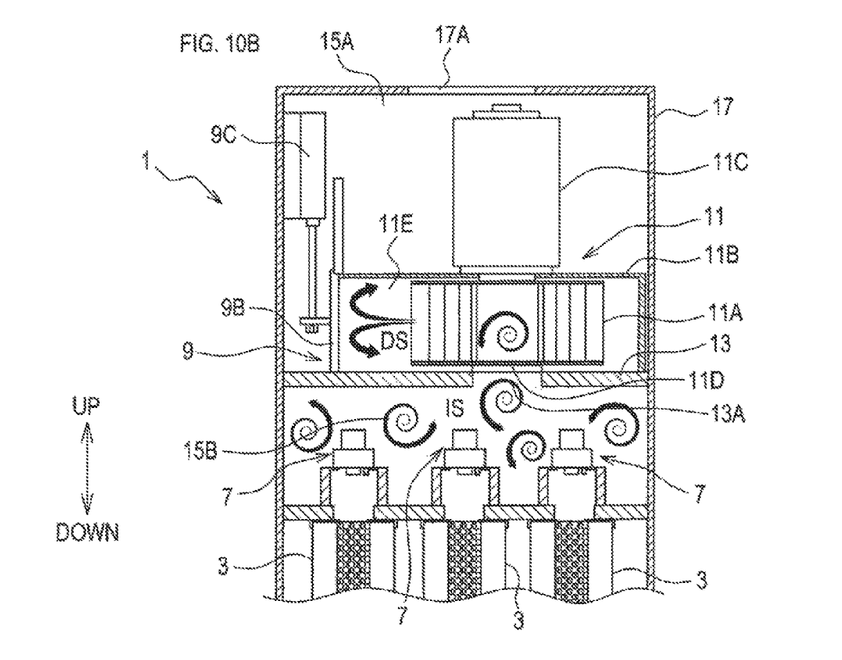

The pressure introduction device 9 according to the present embodiment, as shown in FIG. 10B, is configured to introduce the pressure on the discharge side of the blower 11 to the intake side space by closing the discharge side of the blower 11 by the on-off valve 9B.

That is, in the present embodiment, as shown in FIG. 10A, the discharge side of the blower 11 is in an open state when the dust removal device 7 is not in operation. During operation of the dust removal device 7, as shown in FIG. 10B, the plate-shaped on-off valve 9B is displaced in a sliding manner and the discharge side of the blower 11 is in a closed state.

When the discharge side is closed in a state in which the blower 11 is running, the air discharged from the blower 11 hits the on-off valve 9B so that a pressure wave is generated. The pressure wave propagates toward the intake side (IS) from the discharge side (DS) inside the scroll casing 11B.

Therefore, also in this embodiment, since the pressure on the discharge side of the blower 11 is introduced to the intake side space 15B, the atmospheric pressure in the intake side space 15B can be increased in a very short time. Further, the dust in the filter 3 can be removed in a short time without stopping the blower 11 (dust collection device 1).

[Other Embodiments]

In the above embodiments, the pressure on the discharge side, that is, in the exhaust side space 15A, of the blower 11 is introduced to the intake side space 15B. The present invention is not limited thereto. That is, it is sufficient to introduce a high atmospheric pressure in the intake side space 15B to the downstream side of the filter 3. Thus, for example, an atmospheric pressure may be introduced to the downstream side of the filter 3.

In the above embodiments, the on-off valve 9B is disposed on the discharge side (exhaust side space 15A) of the communication passage 9A. The present invention is not limited to this. The on-off valve 9B may be disposed on the intake side (intake side space 15B) of the communication passage 9A.

The on-off valve 9B according to the embodiments described above is configured to receive the dynamic pressure in the direction to close the communication passage 9A from the blower 11 when the on-off valve 9B is in the position to open the communication passage 9A. The present invention is not limited thereto.

The blower 11 according to the embodiments described above is disposed in the exhaust side space 15A, and sucks the air from the intake side space 15B to generate the air flow passing through the filter 3. The present invention is not limited thereto. For example, by sucking an air containing dust from the outside of the dust collection device 1 and blowing out the air into the filter chamber 5A, the air flow passing through the filter 3 may be generated.

The blower 11 according to the embodiments described above comprises a centrifugal fan. The present invention is not limited thereto. For example, the blower 11 may comprise an axial fan.

The dust removal device 7 according to the embodiments described above is adapted to hit a "lump of air blown at high speed" on the filter 3. The present invention is not limited thereto. For example, the dust removal device 7 may be the one described in Japanese Unexamined Patent Application Publication No. 2010-89027.

In the above embodiments, the dust collection device 1 according to the present invention is described by way of an example of a dust collection device that collects "fine particles of aggregated metal vapor" as dust. Application of the present invention is not limited thereto.

The dust collection device 1 can be applied, for example, to a dust removal device for removing fouling adhering to surfaces of mechanical structures and buildings, or even to a dust collection device that collects dust of metal powder or polishing dust generated during machining.

The present invention is not limited to the embodiments described above, and may encompass any and all embodiments within the scope of the claims. The dust removal device (fouling removal device) is provided with the following characteristics.

(1) A fouling removal device that removes fouling adhering to a surface of an object to be cleaned, the fouling removal device comprising:

an accumulator unit to be filled with a pressurized gas; and an accelerator having an injection port for blowing the gas toward the object to be cleaned, the accelerator comprising a narrowed portion that narrows an air flow released from the accumulator unit, an expansion portion that expands the air flow ejected from a throat portion of the narrowed portion in which a flow passage cross sectional area is most reduced, and a valve portion that opens and closes the throat portion.

(2) The fouling removal device according to the above (1), wherein the accumulator unit and the narrowed portion are in communication at all time.

(3) A dust collection device for removing dust in an atmosphere, the duct collection device comprising:

a filter that removes dust from the atmosphere drawn; and a fouling removal device that removes fouling containing a dust adhering to a surface of the filter, the fouling removal device comprising:

an accumulator unit to be filled with a pressurized gas; and a accelerator having an injection port for blowing the gas toward the filter, the accelerator comprising a narrowed portion that narrows an air flow released from the accumulator unit, an expansion portion that expands the air flow ejected from a throat portion of the narrowed portion in which a flow passage cross sectional area is most reduced, and a valve portion that opens and closes the throat portion.

(4) A fouling removal process for removing fouling adhering to a surface of an object to be cleaned, comprising:

accelerating an air flow to a sonic speed or more, or to a subsonic speed, and injecting the accelerated air flow toward the object to be cleaned.

In the fouling removal device, the air flow ejected from the throat portion can be accelerated to the sonic speed or more, or to the subsonic speed in the expansion portion. Therefore, a shock wave or an air flow with an energy close to the shock wave (hereinafter, also referred to as "shock wave") is emitted to the object to be cleaned from the injection port. Accordingly, the object to be cleaned is in a state of being hit by the shock wave. Thus, fouling adhering to the object to be cleaned drops from the object to be cleaned by the impact and is removed.

A technology related to this is found in Japanese Unexamined Patent Application Publication No. 2010-89027.

A dust collection device described in this publication is provided with a substantially cylindrical filter. Dust in the air (atmosphere) is removed by the filter, and adheres to a surface of the filter and is accumulated.

In the dust collection device described in this publication, a projecting piece is provided on an inner side of the filter. By hitting and snapping an inner peripheral side of the filter with the projecting piece, fouling or the like adhering to the surface of the filter is removed.

The invention claimed is:

1. A dust collection device that removes dust in an atmosphere, the dust collection device comprising:

a substantially cylindrical filter that removes the dust from the atmosphere drawn into a filter chamber, the filter chamber configured to hold a filter, the filter having one end in an axial direction of the filter being closed;

an accumulator unit to be filled with a pressurized gas;

a fouling removal device configured to remove fouling containing dust adhering to a surface of the filter, the fouling removal device comprising an accelerator subassembly, the accelerator subassembly configured to accelerate an air flow to the sonic speed or more by the accelerator subassembly being injected toward an inside of the filter from another end in the axial direction of the filter to generate a shock wave such that at least some of the fouling adhering to the filter being removed by impact of the shock wave, and the accelerator subassembly comprising:

an injection port for blowing the gas toward the other end in the axial direction of the filter;

a narrowed portion that narrows an air flow released from the accumulator unit;

an expansion portion that expands the air flow ejected from a throat portion in which a flow passage cross sectional area is most reduced;

a cylindrical portion that has the injection port at one end of the cylindrical portion in an axial direction, and has the throat portion at another end of the cylindrical portion in the axial direction; and a valve portion that has a radius greater than an inner diameter of the cylindrical portion, the valve portion configured to open and close the throat portion by coming into and out of contact with the other end of the cylindrical portion in the axial direction, when the valve portion is in a state displaceably disposed inside a housing, the valve portion is to come into and out of contact in accordance with a difference between a pressure acting on a surface on a side of the cylindrical portion and a pressure acting on a surface opposite to the cylindrical portion across the valve portion, a space provided on an outer periphery of the cylindrical portion being in communication with the accumulator at all times, when the valve portion is in a state where the valve portion is in contact with the other end in the axial direction of the cylindrical portion, the valve portion is to close the throat portion, and a pressure equal to a pressure inside the accumulator acting on a part of the valve portion not in contact with the cylindrical portion, when the valve portion is in a state where the throat portion of the accelerator subassembly is closed, the other end in the axial direction of the cylindrical portion is in contact with a central part of the valve portion;

a valve configured to open the throat portion by opening a side of the valve portion opposite to the cylindrical portion to air and separating the valve portion from the other end in the axial direction of the cylindrical portion; and a pump configured to fill the accumulator unit with a pressurized gas, the pump comprising a discharge side that is communicable with the side of the valve portion opposite to the cylindrical portion, wherein a gas supplied by the pump flows through a gap between an outer peripheral edge of the valve portion and the housing to flow into the accumulator unit via the narrowed portion.

* * * * *